United States Patent [19]
Poissant et al.

[11] Patent Number: 5,690,446
[45] Date of Patent: Nov. 25, 1997

[54] CONNECTION SYSTEM FOR CONNECTING STRUTS TO CONSTRUCT THREE-DIMENSIONAL STRUCTURES

[75] Inventors: Philip Laurier Poissant; Jane Elizabeth Somerville, both of Toronto, Canada

[73] Assignee: Somerville House Books Limited, Toronto, Canada

[21] Appl. No.: 664,916

[22] Filed: Jun. 18, 1996

[51] Int. Cl.[6] ............................................. A63H 33/08
[52] U.S. Cl. ..................... 403/361; 403/169; 403/217; 446/120; 446/126
[58] Field of Search ........................... 403/169, 170, 403/171, 176, 217, 361; 52/648.1, 653.2, 655.1, 655.2, 656.9, DIG. 10; 446/120, 121, 124, 126

[56] References Cited

U.S. PATENT DOCUMENTS

| | | | |
|---|---|---|---|
| 814,367 | 3/1906 | Given | 446/126 |
| 1,155,035 | 9/1915 | Bostwick | 446/126 |
| 1,400,066 | 12/1921 | Huck | 446/126 X |
| 1,472,536 | 10/1923 | Thomson | 446/126 X |
| 1,608,592 | 11/1926 | Funk | 446/126 |
| 3,452,989 | 7/1969 | Jernstrom | 446/120 X |
| 3,873,220 | 3/1975 | Kashiwabara | 403/217 X |
| 4,129,975 | 12/1978 | Gabriel | 52/648 |
| 5,282,767 | 2/1994 | Gelardi | 446/126 |

FOREIGN PATENT DOCUMENTS

| | | | |
|---|---|---|---|
| 2362592 | 6/1975 | Germany | 403/170 |
| WO 94/20185 | 9/1994 | WIPO | 446/124 |

OTHER PUBLICATIONS

6 Sided Plastic Cube Having Cylindrical Extensions as Described in Information Disclosure Statement.

*Primary Examiner*—Anthony Knight

[57] ABSTRACT

A connection system for connecting struts formed from paper or paper-like sheets rolled into a tube is made of cylindrical receptors and connectors. Each cylindrical receptor has an inside diameter approximately equal to or slightly smaller than the predetermined outside diameter of the tube for friction-fit engagement onto the end of the tube. Each cylindrical receptor also has a finger which is centrally disposed within the receptor, about the longitudinal axis thereof. At least a part of such finger is substantially the same size as the inside diameter of the tube. The finger is made of a plurality of longitudinal ribs extending radially from its longitudinal axis. Each receptor is press-fit engageable with a connector. Each connector is press-fit engageable with at least two receptors. The connection system allows for the connection of struts which can be readily constructed by the user of the construction system.

13 Claims, 11 Drawing Sheets

CONNECTION SYSTEM FOR CONNECTING STRUTS TO CONSTRUCT THREE-DIMENSIONAL STRUCTURES

FIELD OF THE INVENTION

This invention relates to connection system for connecting struts to construct three-dimensional structures.

BACKGROUND OF THE INVENTION

Connection systems for connecting struts to construct three-dimensional useful structures, such as furniture, toys and buildings are numerous in the prior art. Such a system, for example, is shown in Gabriel U.S. Pat. No. 4,129,975. The prior art connection systems, however, utilize struts which are custom manufactured to cooperate with the connection systems. For example, in Gabriel, the struts utilized have snap fit clip ends. In Gelardi U.S. Pat. No. 5,282,767, the struts utilized have joint ends and flanges. The connection systems of the prior art require the user to purchase such custom manufactured struts. Due to the design of the connection systems, the user cannot readily construct his own struts. As a result, the user's ability to construct various structures is constrained by the pre-determined length of the custom-manufactured struts.

It would be helpful to have a connection system which connects struts which do not have to be custom manufactured, but which can be readily constructed by the user of the connection system from an abundant, relatively inexpensive recyclable material such as newspaper. As paper such as newspaper is generally readily available in sufficient quantity, it would be helpful to have a connection system which connects struts constructed from re-used paper, such as newspaper.

SUMMARY OF THE INVENTION

The connection system of the present invention is for connecting tubular struts to form a three-dimensional framework. Each strut is formed from at least one paper sheet rolled into a tube having a predetermined outside and inside diameter.

In one aspect, the connection system comprises a plurality of cylindrical receptors, each having an end for receiving one end of a tubular strut or tube and a connector for connecting at least two receptors to the connector. In the preferred embodiment, a finger projects from the interior of the cylindrical receptor such that when one end of a strut or tube is inserted into the receptor, the finger matingly projects into the inside of the tube. The outside and inside diameters of the tube are such that its end friction fits into the open end of the receptor and does not slip out from it. In the preferred embodiment, a connector is connected to a receptor by press fit engagement of connecting means on the receptor with complementary connecting means on the connector. In the preferred embodiment, the complementary connecting means on the connector is an opening and the connecting means on the receptor is an extension. Further, in the preferred embodiment, the connector is generally cubic and has an opening in the centre of each of its faces. By using the connection system of the present invention, tubes can be connected to form a variety of frameworks having three-dimensional geometrical configurations.

It is a broad aspect of this invention to provide a connection system for connecting struts formed from paper or paper-like sheets rolled into a tubular strut or tube comprising (i) a plurality of cylindrical receptors each having an inside diameter approximately equal to or slightly smaller than the predetermined outside diameter of the tubes for friction-fit engagement onto the ends of each tube and in which the receptors also have separate connecting means on each receptor for press-fit detachable engagement of each receptor with a complementary connecting means on a connector and (ii) a plurality of connectors wherein each connector has at least two such complementary connecting means for connecting at least two receptors to the connector and by this to each other.

In another aspect, the invention comprises a receptor for a rolled paper tube comprising a cylinder of an inside diameter approximately equal to or slightly smaller than the predetermined outside diameter of a rolled paper tube to be inserted into the cylinder at one end and a finger within the cylinder and centrally disposed about the longitudinal axis of the cylinder, formed from a plurality of longitudinal ribs and defining between the outside surface of the finger and the inside surface of the cylinder an annular channel for receiving the paper tube and in which a part of the finger is substantially located at the inside diameter of the tube and means on the cylinder for connection to another receptor for a rolled paper tube.

BRIEF DESCRIPTION OF THE DRAWINGS

For a better understanding of the present invention and to show more clearly how it may be carried into effect, reference will now be made by way of example to the accompanying drawings, which show an apparatus according to the preferred embodiment of the present invention and in which.

DETAILED DESCRIPTION OF THE DRAWINGS

Figure 1:
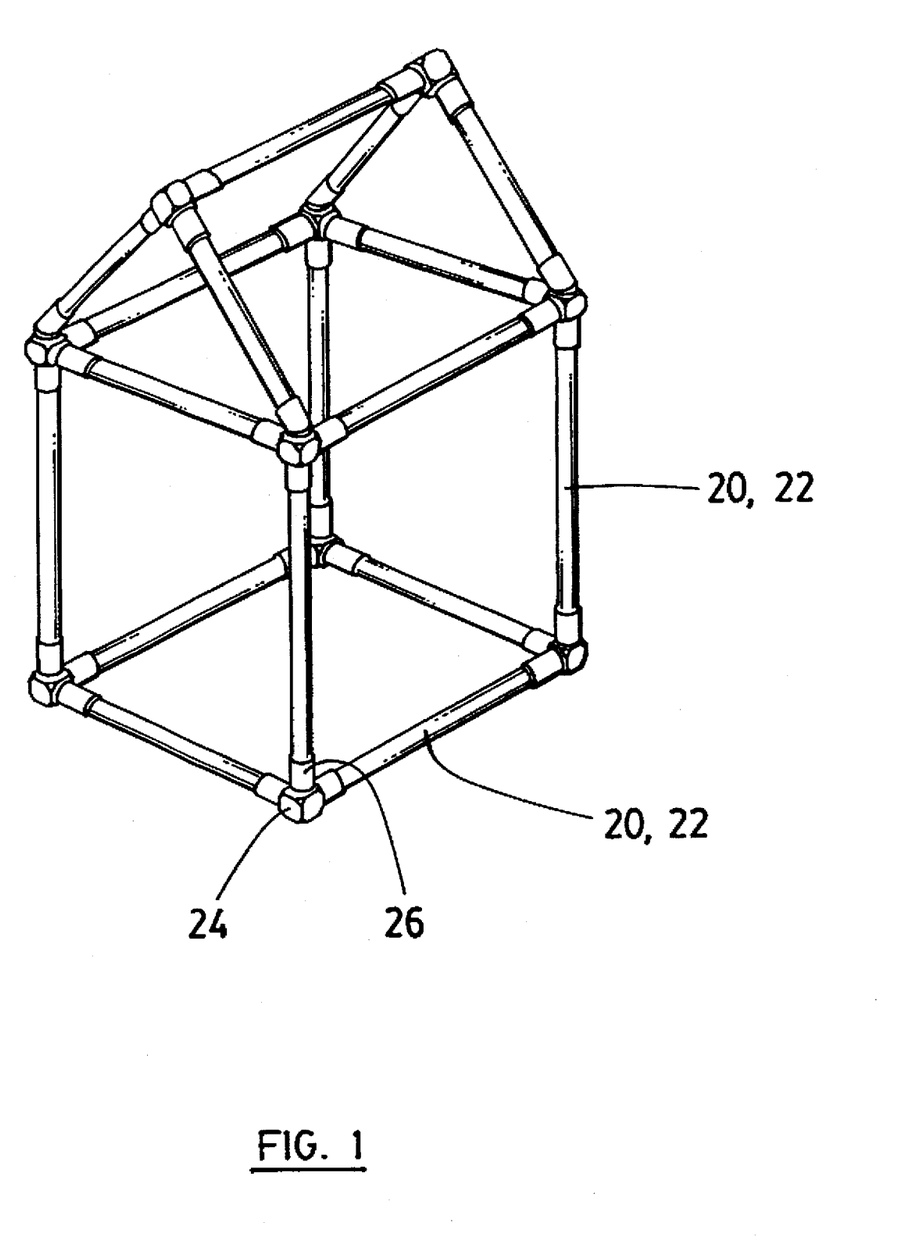
FIG. 1 is a pictorial view showing a framework formed using the connection system of the present invention and struts formed at least one paper sheet rolled into a tube.

Referring to FIG. 1, the connection system of the present invention is for connecting tubular struts 20 to form a framework. Each strut 20 is comprised of at least one paper sheet rolled into a tube 22, having a predetermined outside and inside diameter.

Figure 2:
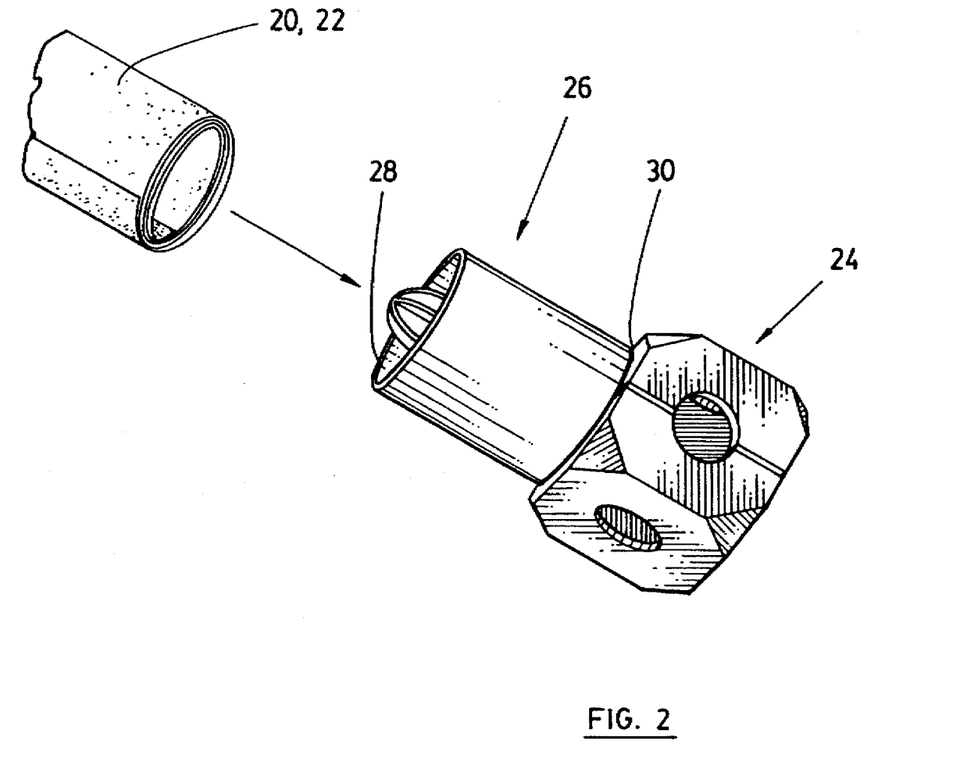
FIG. 2 is a perspective view of the connection system and an end of the tube.

In the preferred embodiment, the connection system comprises a plurality of connectors 24 and a plurality of cylindrical receptors 26. One such connector 24 and one such receptor 26 are best illustrated in FIG. 2. Receptor 26 has an open end 28 and an insertion end 30. Open end 28 has an inside diameter approximately equal to or slightly smaller than the predetermined outside diameter of tube 22 for friction-fit engagement onto the end of tube. Connector 24 connects at least two receptors 26 to it at their insertion ends 30.

Figure 3:
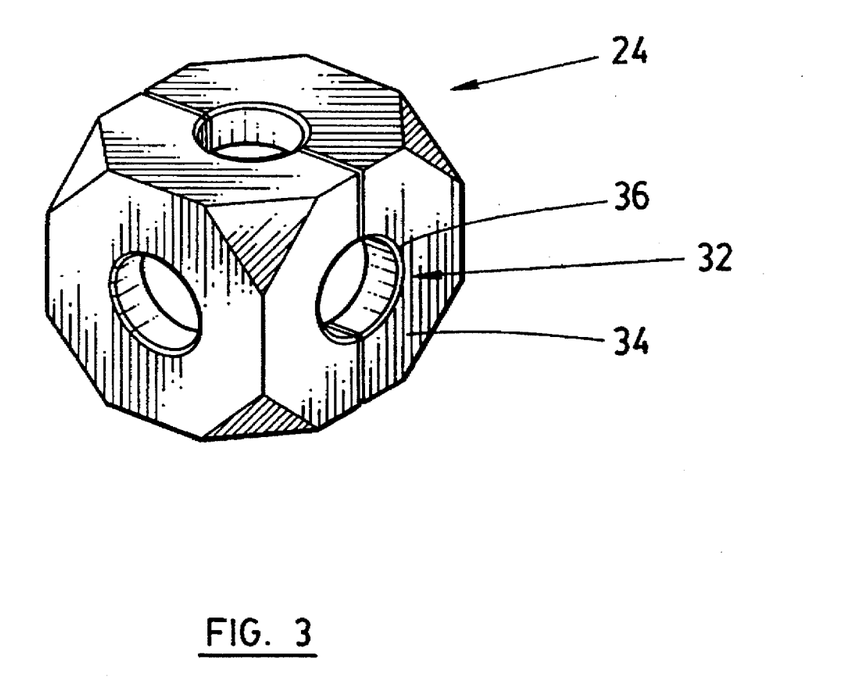
FIG. 3 is a perspective view of the connector of the present connection system.

In the preferred embodiment, connector 24 connects to receptors 26 by press-fit detachable engagement of a separate connecting means on each receptor with a complementary connecting means on the connector. Each connector 24 has at least two such complementary connecting means for connecting at least two receptors 26 to the connector 24. In the preferred embodiment, the connecting means on the receptor is an extension 50 (FIGS. 4 and 5), while the complementary connecting means on the connector is an opening 32 (FIG. 3). Although in the preferred embodiment the receptor 26 has an extension 50 for insertion into connector 24, the extension 50 could be on the connector 24 for insertion into the receptor 26. In addition, any secure detachable method can be used for connecting connector 24 with receptors 26 which could include, for instance, velcro, screws, bolts or pins.

In the preferred embodiment, best illustrated in FIG. 3, each connector 24 is hollow and generally cubic in shape. A reader skilled in the art will realize that the connector 24 need not be cubic, but may be of any shape provided that the connector preferably has at least three complementary connecting means in which a second complementary connecting means is approximately 90 degrees from a first complementary connecting means and in which a third complementary connecting means is approximately 180 degrees from the first complementary connecting means, thereby permitting the receptors to be joined at 90 degree or 180 degree angles with respect to one another. For example, the connector 24 could be a ball, an octagon, a pyramid or any convenient multi-sided shape. For some multi-sided shapes, openings could be placed at 45 degree angles so as to avoid the use of the second variant shown in FIG. 5.

Figure 4:
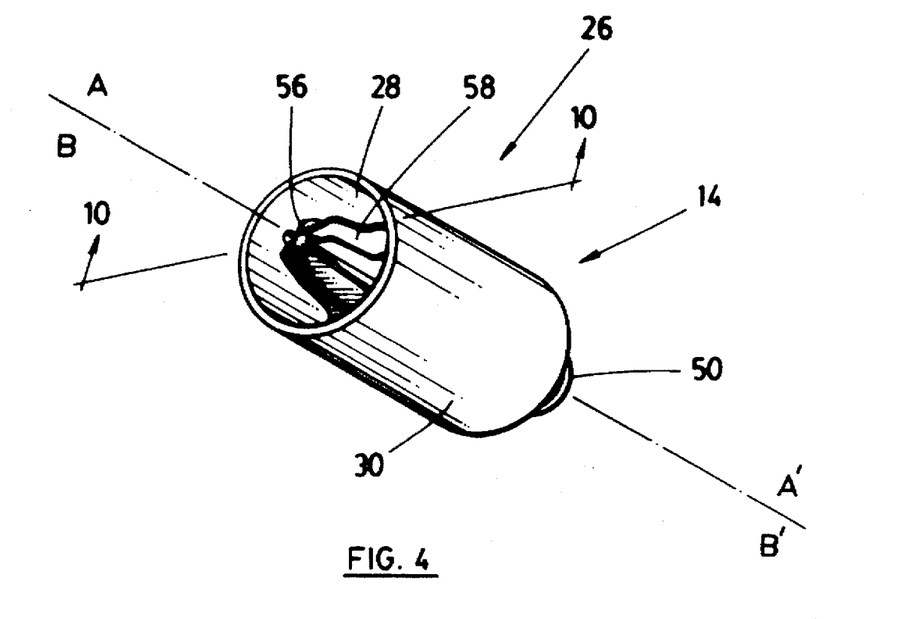
FIG. 4 is a perspective view of one embodiment of the receptor of the present connection system.

Referring to FIG. 4, in one variant of receptor 26, each receptor 26 comprises an open end 28 circumscribing a central axis $AA^i$, and an insertion end 30 circumscribing a central axis $BB^i$, wherein central axis $BB^i$ is coincident with central axis $AA^i$.

Figure 5:
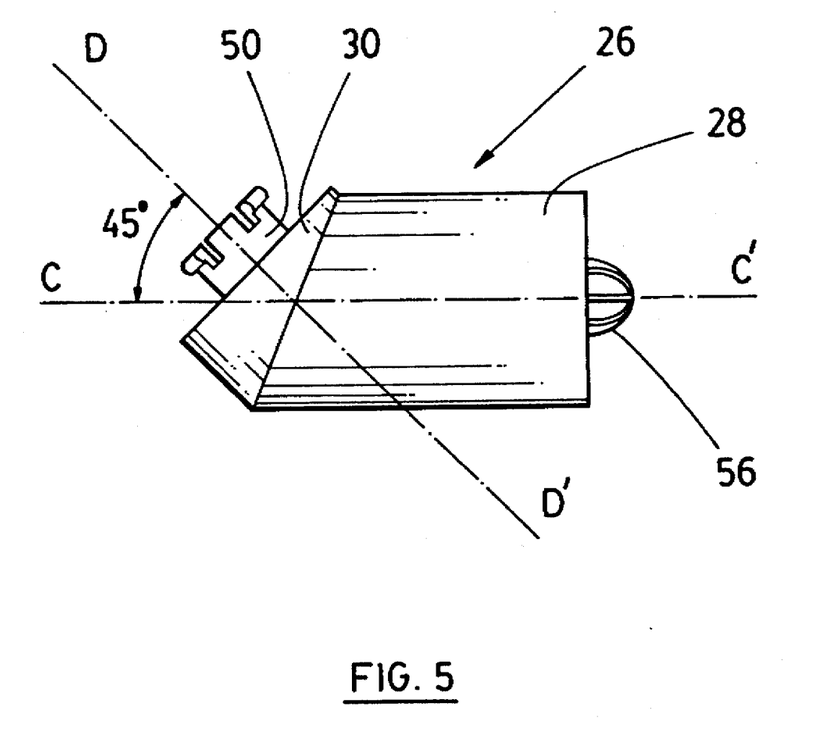
FIG. 5 is a side elevational view of a second embodiment of the receptor of the present connection system.

Referring to FIG. 5, in a second variant of receptor 26, each receptor 26 comprises an open end 28 circumscribing a central axis $CC^i$, and an insertion end 30 circumscribing a central axis $DD^i$, wherein central axis $DD^i$ is oriented at a 45 degree angle with respect to central axis $CC^i$.

Figure 6:
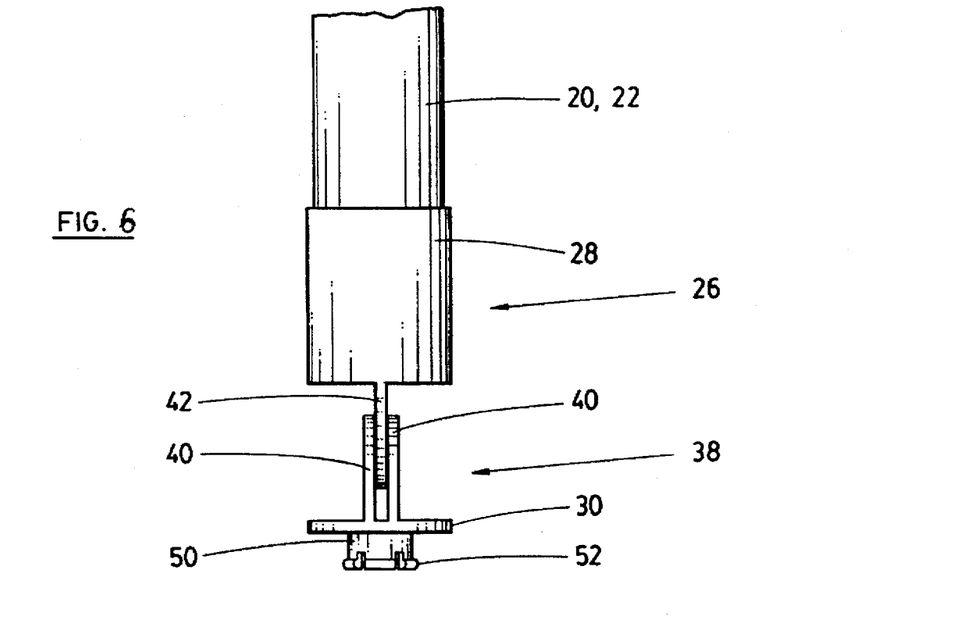
FIG. 6 is a front elevational view of a third embodiment of the receptor of the present connection system.
Figure 7:
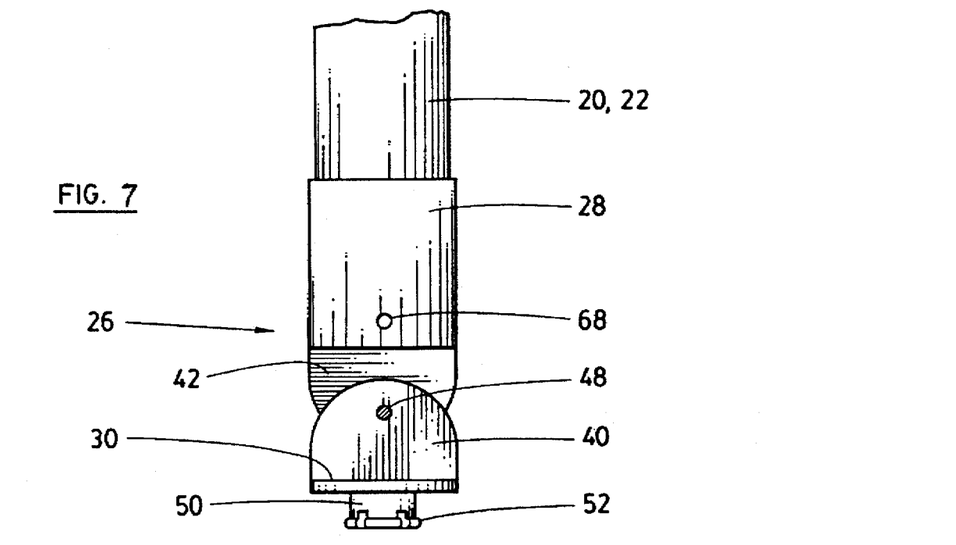
FIG. 7 is a side elevational view of the receptor shown in FIG. 6.
Figure 8:
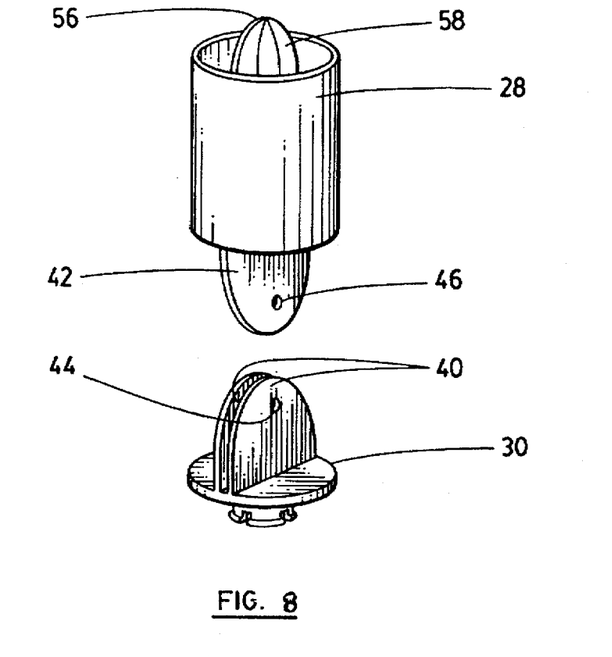
FIG. 8 is a perspective unassembled view of the receptor shown in FIG. 6.

Referring to FIGS. 6, 7 and 8, in a third variant of receptor 26, each receptor comprises an open end 28, an insertion end 30, and intermediate hinging means 38 for hingedly connecting the open end 28 to the insertion end 30. In the preferred embodiment of the third variant, the hinging means 38 comprises a knuckle joint in which the insertion end 30 has a pair of side leaves 40 projecting therefrom and the open end 28 has a center leaf 42 extending therefrom to slide between the pair of side leaves 40. Each leaf 40 has an eye through which a pin 48 is inserted to retain the center leaf 42 in place between the side leaves 40. The reader should note that the hinging means 38 need not comprise a knuckle hinge, but may be of any construction, provided that the hinging means 38 permits the open end 28 to swing up to 180 degrees about the axis of rotation of the hinging means 38. Although in the preferred embodiment, the insertion end 30 has the pair of side leaves 40 and open end 28 has the center leaf 42, in an equally preferred embodiment, the center leaf 42 could be on the insertion end 30 and the side leaves 40 could be on the open end 28.

Figure 9:
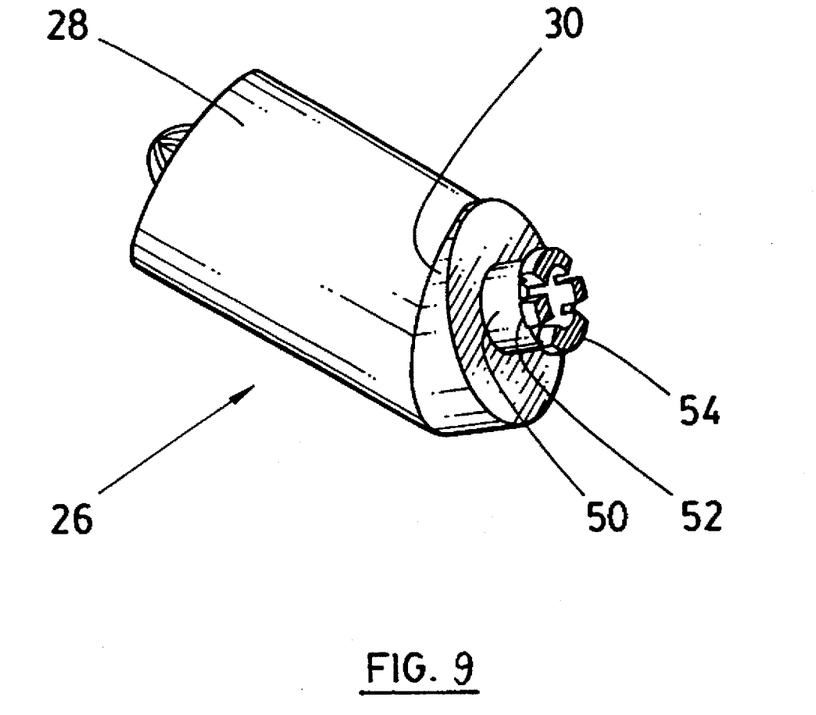
FIG. 9 is a rear perspective unassembled view of the second embodiment of the receptor shown in FIG. 5.

As best shown in FIG. 9, extension 50 projects from the insertion end 30 of the receptor away from the open end 28. The extension 50 is centrally disposed on the insertion end 30. Extension 50, being circular in cross-section in the preferred embodiment, is adapted for insertion into the circular opening 32 on the connector 24 (FIG. 3). Referring again to FIG. 9, extension 50 has a flange 52 circumscribing its free end 54 for interlocking with a connector 24 once extension 50 is fully inserted and seated in the opening 32 on a connector 24. In the preferred embodiment, flange 52 resembles a battlement. Opening 32 has a diameter slightly greater than the diameter of extension 50, but slightly smaller than the diameter of extension 50 at flange 52. Flange 52, however, is slightly compressible. Thus, when extension 50 is urged against opening 32, flange 52 is deflected slightly inwardly, such that the diameter of opening 32 in this compressed position is slightly greater than the diameter of extension 50 at flange 52. This permits extension 50 to be inserted into opening 32. Bevelled edge 36 (FIG. 3) of opening 32 facilitates such insertion. Once extension 50 is fully inserted into opening 32 of connector 24, flange 52 resumes its normal position and prevents extension 50 from being removed from opening 32 by the application of an axial tensile force. Extension 50, however, can be removed from opening 32 by the application of a bending force.

From the foregoing description, it is clear that in the first variant of receptor 26 shown in FIG. 2, receptor 26 is adapted to receive one end of a strut 20 such that the strut 20 is at an angle perpendicular to the face 34 (FIG. 3) in the connector 24 having opening 32 in which extension 50 (not shown) of receptor 26 is inserted. In addition, it is also clear that in the second variant of receptor 26 shown in FIG. 5, receptor 26 is adapted to receive one end of a strut 20 (not shown) such that strut 20 is at a 45 degree angle with the face 34 in the connector 24 (not shown) having opening 32 in which extension 50 of receptor 26 is inserted. Finally, it is also clear that in the third variant of receptor 26 shown in FIGS. 6, 7 and 8, receptor 26 is adapted to receive one end of a strut 20 such that the strut 20 can be positioned at an angle between 0 and 180 degrees with respect to the face 34 in the connector 24 having opening 32 in which extension 50 of receptor 26 is inserted.

Figure 10:
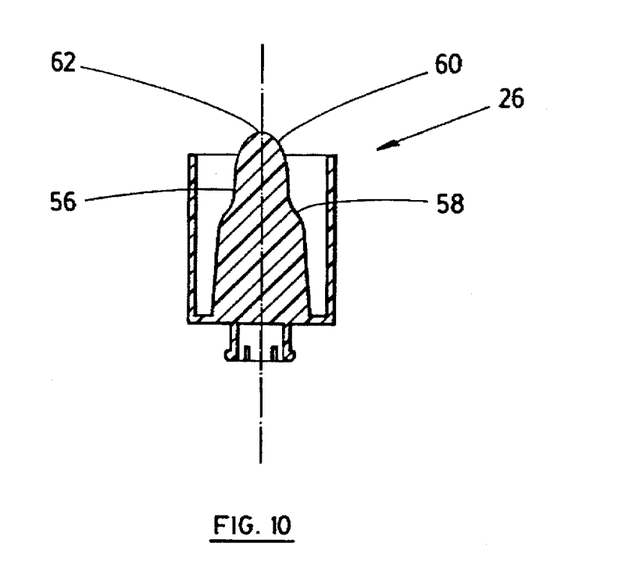
FIG. 10 shown on the same page as FIG. 8, is a sectional view of the receptor of FIG. 4 taken along line 10—10.
Figure 11:
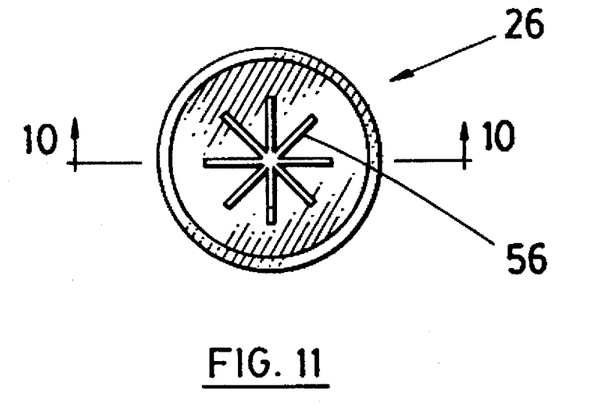
FIG. 11 is a plan view of the open end of the receptor of FIG. 4.

As is best illustrated in FIG. 4, finger 56 projects from the insertion end 30 of receptor 26 into and beyond the open end 28 of receptor 26. Finger 56 is made of a plurality of longitudinal ribs 58 extending radially from the longitudinal axis of finger 56. Finger 56 is symmetric about its longitudinal axis. The radius of each rib 58 decreases as the distance to the insertion end 30 of receptor 26 increases. At a distance from the bottom of the finger 56 of greater than one half the length of finger 56, each rib 58 is reduced radially so that it curves inwardly. Thus, each rib 58 has the side profile of half a bell, as is best illustrated in FIG. 10. At distal end 60 of finger 56, ribs 58 taper to form a finger tip 62. Finger 56 is star-shaped in plan, FIG. 11. The outside surface of finger 56 and the inside surface of the receptor 26 define an annular channel for receiving the tube 22.

Figure 12:
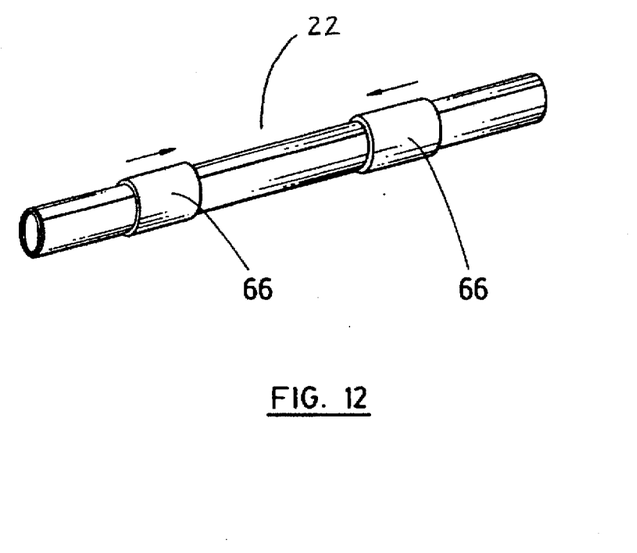
FIG. 12 is a perspective view of a tube with strut rings slipped over each end.
Figure 13:
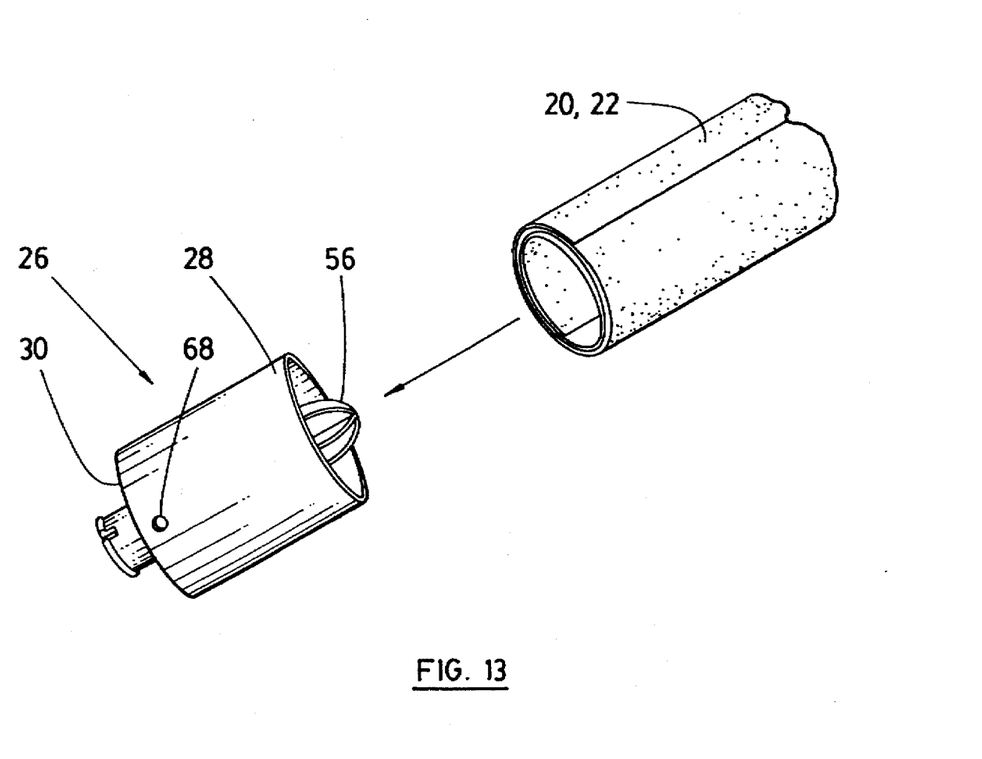
FIG. 13 is a partial fragmentary perspective view of a receptor and a tube.
Figure 14:
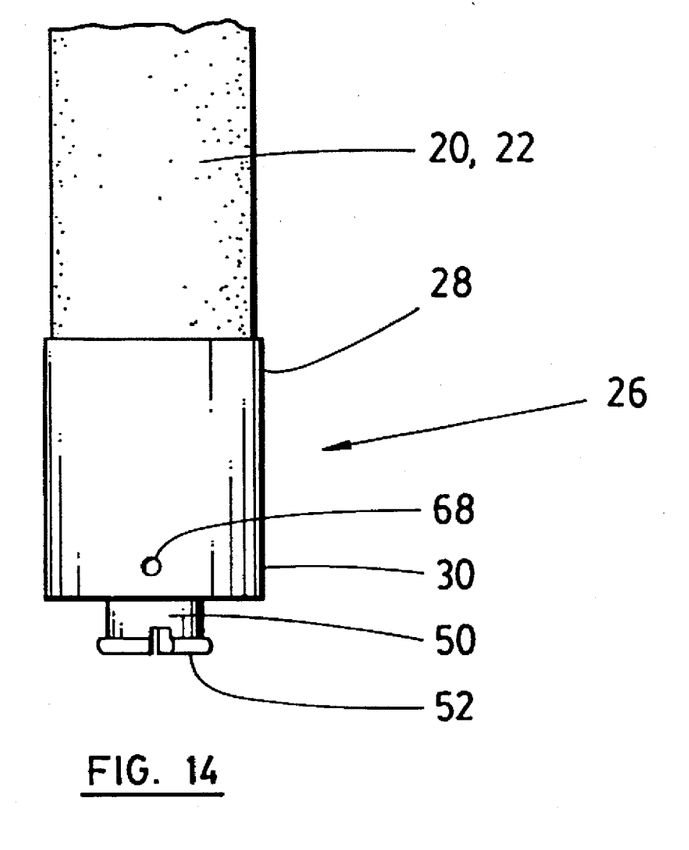
FIG. 14 is a fully assembled elevational view of the receptor and tube of FIG. 13.

As mentioned previously, strut 20 comprises a tube 22 formed of at least one paper sheet rolled into a tube 22, having a predetermined outside and inside diameter. In one embodiment, tube 22 is formed of a plurality of paper sheets 64 (not shown). Paper sheets 64 of equal size are stacked neatly, one on top of the other, such that each sheet is lined up evenly with the sheet below. The paper sheets 64 are rolled to form a tightly rolled tube 22. Strut rings 66 having an inside diameter corresponding to the inside diameter of open end 28 of receptor 26 are slipped over each end of tube 22, FIG. 12. Tube 22 unrolls by itself to fit snugly to the inside diameter of the rings 66, such that tube 22 is hollow. Tube 22 is fastened with fastening means, for example with tape or another adhesive, so that it does not unroll and such that the diameter of tube 22 maintains the same diameter as rings 66. Strut rings 66 are then removed from tube 22. As shown in FIGS. 2 and 13, strut 20 or tube 22 is attached to a receptor 26 by fully inserting one end of tube 22 into open end 28 of receptor 26 so that finger 56 is substantially located at the inside diameter of the tube 22. Tube 22 is fully inserted into open end 28 of receptor 26 when tube 22 can be seen through hole 68 as shown in FIG. 14. Hole 68 is located in the side of the receptor 26, near the insertion end 30.

The outside and inside diameters of tube 22 are such that tube 22 friction fits snugly into open end 28 of receptor 26, such that tube 22 does not slip out from receptor 26. When fully inserted into open end 28 of receptor 26, tube 22 is wedged between finger 56 and the inside surface of the receptor 26.

Receptor 26 is attached to connector 24 by forcing extension 50 into opening 32 of connector 24 as described above.

While the invention has been described with reference to specific embodiments, modifications and variations of the invention may be constructed without departing from the scope of the invention which is defined by the claims which follow.

We claim:

1. A connection system for connecting struts formed from paper or paper-like sheets rolled into a tube comprising
   (i) a plurality of cylindrical receptors, each receptor having
      (a) an inside diameter approximately equal to or slightly smaller than the predetermined outside diameter of the tubes for friction-fit engagement onto the ends of each tube;
      (b) a finger centrally disposed within the receptor and about the longitudinal axis of the cylinder and in which at least a part of such finger is substantially the same size as the inside diameter of the tube, wherein such finger is made of a plurality of longitudinal ribs extending radially from the longitudinal axis of the finger; and
      (c) connecting means for press-fit detachable engagement of each receptor with a complementary connecting means on a connector; and
   (ii) a plurality of connectors wherein each connector has at least two such complementary connecting means for connecting at least two receptors to the connector and by this to each other.

2. The connection system of claim 1 wherein some connectors have at least three connecting means and in which one of the connecting means is approximately 90 degrees and the other is approximately 180 degrees from the first such connecting means, so that the receptors may be joined at 90 degree or 180 degree angles to one another.

3. The connection system of claim 2 wherein the radius of each one of the ribs decreases as the distance to the insertion end of the receptor increases.

4. The connection system of claim 3 wherein the finger is symmetric about its longitudinal axis.

5. The connection system of claim 4 wherein the finger extends beyond one end of the receptor.

6. The connection system of claim 5 wherein at a distance from the bottom of the finger of greater than one half the length of the finger, each rib curves inwardly.

7. The connection system of claim 6 wherein the connecting means on the connector is an opening and the connecting means on the receptor is an extension on the receptor for insertion into the opening.

8. The connection system of claim 7 wherein the extension has a circular cross-section and the free end of the extension is circumscribed by a flange.

9. The connection system of claim 8 wherein the opening is circular, and the flange is slightly compressible, so that in its compressed position when being inserted into the opening, the diameter of the flange is slightly smaller than the diameter of the opening and in its relaxed position when seated in the opening, the diameter of the flange is slightly greater than the diameter of the opening.

10. The connection system of claim 2 wherein the connector is generally cubic and connecting means are located in the centre of each of its faces.

11. The connection system of claim 10 wherein the connecting means of the receptor is at an angle of either 0 degrees or 45 degrees from the longitudinal axis of the receptor.

12. The connection system of claim 10 wherein the receptor and the connecting means are hingedly connected by hinging means disposed there between.

13. A receptor for a rolled paper tube comprising
   (i) a cylinder of an inside diameter approximately equal to or slightly smaller than the predetermined outside diameter of a rolled paper tube to be inserted into the cylinder at one end and
   (ii) a finger within the cylinder and centrally disposed about the longitudinal axis of the cylinder, formed from a plurality of longitudinal ribs and defining between the outside surface of the finger and the inside surface of the cylinder an annular channel for receiving the paper tube and in which a part of the finger is substantially located at the inside diameter of the tube and
   (iii) means on the cylinder for connection to another receptor for a rolled paper tube.

* * * * *